June 8, 1965  D. KARMIGGELT ETAL  3,188,476
PHOTO-ELECTRIC CELL
Filed Jan. 7, 1963
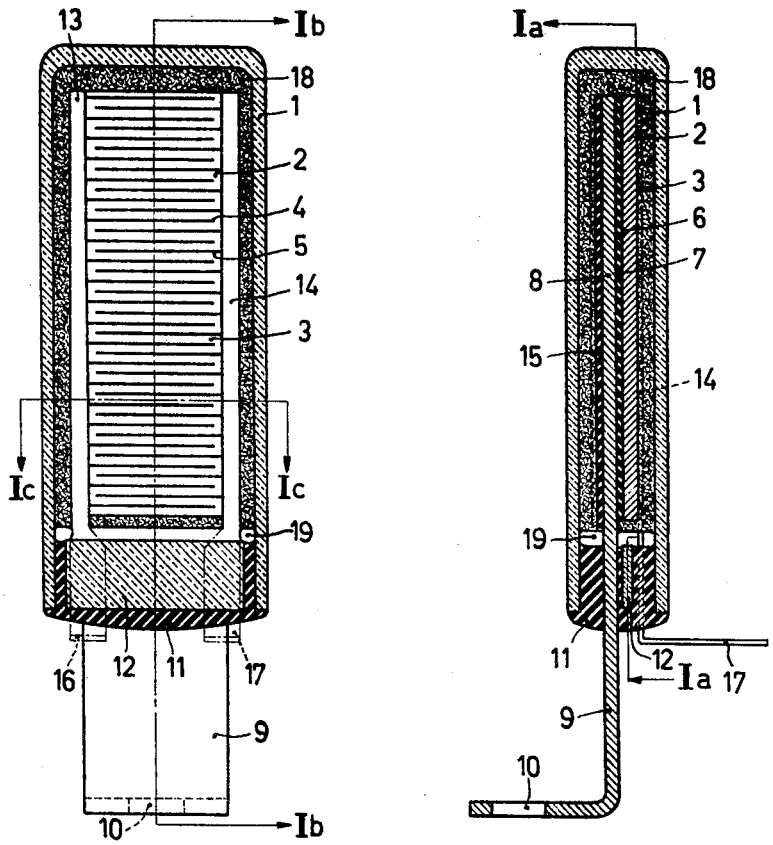
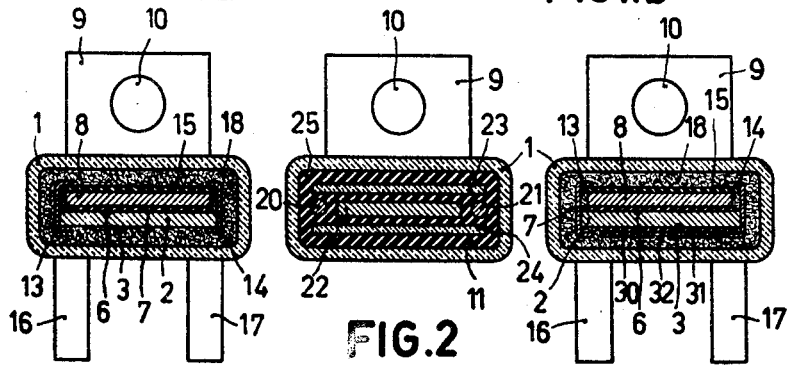
INVENTORS
DICK KARMIGGELT
HERMAN M. SCHRODER &
HENDRIKUS J.M. VAN TOL
BY
Frank R. Trifari
AGENT

United States Patent Office 3,188,476
Patented June 8, 1965

3,188,476
PHOTO-ELECTRIC CELL
Dick Karmiggelt, Herman Mathieu Schroder, and Hendrikus Johannes Marie van Tol, Emmasingel, Eindhoven, Netherlands, assignors to North American Philips Company Inc., New York, N.Y., a corporation of Delaware
Filed Jan. 7, 1963, Ser. No. 249,730
Claims priority, application Netherlands, Jan. 29, 1962, 274,115
8 Claims. (Cl. 250—211)

The invention relates to a photo-electric cell comprising a plate-shaped photo-sensitive body provided on one side with an electrode system and arranged in an insulating, preferably glass, envelope having at least one sealed aperture for the passage of electric supply conductors for the electrode system.

In a commonly used embodiment of such a photo-electric cell, the photo-sensitive or photoconductive body consists of a chalcogenide of a bivalent metal, for example cadmium sulphide or cadmium selenide, and usually has the shape of a thin rectangular or circular plate. An electrode system, which generally comprises at least two comb-like interlaced electrode lines deposited from vapour, is provided on one side of this plate, which hereinafter will be referred to as the active side. The radiation to be detected strikes this side provided with the electrode system through the envelope. The envelope preferably consists of glass but may, if required, be made of synthetic resin.

It has proved very difficult in practice to manufacture a simple and appropriate embodiment of such a photo-electric cell which fulfils the various frequently more or less conflicting requirements to be satisfied in practice. It is, for example, frequently desirable for the size of the envelope to be as small as is necessary in view of the size of the photo-sensitive body. However, the photo-electric cell must be suitable for use at comparatively high electric powers, that is to say, an adequate cooling system is to be provided without the size of the cell being excessively enlarged. In view of its sensitivity to ambient gases, for example, water vapour, a satisfactory hermetic seal is desired but because of the temperature sensitivity of the photo-sensitive body this seal should preferably be capable of being provided without the body being exposed to elevated temperatures. Further requirements are simplicity and appropriate structure so as to permit mass manufacture at low costs.

It is an object of the present invention to provide a particularly simple and appropriate embodiment of a photo-electric cell which by suitable construction and design of the cooling system and the envelope permits a high electric load capacity together with a small size of the envelope, while furthermore the sealing requirements are simply satisfied.

According to the invention for this purpose in a photo-electric cell of the kind described in the preamble, the other side of the photo-sensitive plate which is not covered with the electrode system and hereinafter will be referred to as neutral side, is at least through a large part in heat conducting contact with part of a metal cooling plate electrically insulated from the said active side of the photo-sensitive plate, the photo-sensitive body and at least the part of the cooling plate occupied thereby being enclosed in an elongated tubular envelope open at at least one end, which preferably has the form of a flat tube fitting over the body and the cooling plate with a small amount of clearance, while through at least one sealed aperture and in an electrically insulated manner with respect to the supplyleads , a further part of the cooling plate projects beyond the seal in order to dissipate heat to the ambience. A cooling fin may be secured to this projecting part or this part may itself be designed as a cooling fin. In a preferred embodiment of such a device, the part of the cooling plate projecting beyond the seal is also designed as a support for mounting on a chassis or a further cooling member.

Since on irradiation of the active side of the photo-sensitive plate a material increase of the conductivity is only produced in a very thin layer of thickness, for example, from 10 to 30 microns below the surface on the active side, the use of a sufficiently, for example 1 mm., thick photo-sensitive plate enables the cooling plate and the active side to be electrically insulated from one another in a degree which is sufficient for some uses by the presence of the remainder of the insulating photo-sensitive material as an insulating layer between the active and neutral sides. In this case, the metal cooling plate may, if desired, be directly applied to the neutral side of the photo-sensitive plate, if required, with the interposition of a layer of solder, for example, tin-indium solder, promoting the heat dissipation. In many other cases where a better or different electric insulation is required between the active side and the cooling plate, a thin electrically insulating intermediate layer, for example, a layer of an insulating adhesive, for example, an epoxy resin, is preferably interposed between the neutral side and the cooling plate, or, when using, for example, an anodized aluminum plate, an insulating oxide film on the cooling plate may be brought into engagement with the neutral side. The insulating intermediate layer, however, is made as thin as possible, or of a material such as to interfere as little as possible with the heat transfer between the photo-sensitive plate and the cooling plate.

The tubular envelope, which preferably is a flat glass tube, may have a sealed aperture for the passage of the cooling plate and the supply leads at either end. The cooling plate may project beyond the seal at both ends. The cooling plate may alternatively be brought out through one aperture and the electric supply leads through the other, in which case electric insulation between the cooling plate and the supply leads is ensured in a very simple manner. Sealing is preferably carried out at a low temperature, for example, with the aid of a soldered joint between the cooling plate and the wall of the envelope. Such soldered joints may be produced at a low temperature, for example, at a temperature below 150° C., by coating the glass wall in known manner with a layer of metal, for example, gold or silver, and using a low-melting-point solder, for example an indium-tin solder. One of the seals may be a glass seal provided before the insertion of the photo-sensitive body. However, a seal consisting of a synthetic material, for example, an epoxy resin, is preferably used in combination with a compensating filling member which consists, for example, of glass or ceramic material, and compensates, at least partially, for any differences in coefficient of expansion between the envelope and the sealing material so as to prevent fracture. Especially in the case of a sealed aperture through which a cooling plate is brought out, in addition to the synthetic resin, use is made of one or more filling members which are evenly distributed through the seal and preferably also with respect to the cooling plate and entirely or partly compensate for the expansion of the metal cooling plate and the synthetic material with respect to the envelope and preferably are made of quartz or a material having a coefficient of expansion much lower than that of the glass of the envelope, for example, a coefficient of expansion of $2 \times 10^{-7}$, which is the increase in length per unit per degree C.

In a particularly simple and appropriate embodiment of a photo-electric cell in accordance with the invention, the tubular envelope has only one aperture which is sealed by a synthetic material, which may be combined with a filling member, and through which the electric supply leads and the cooling plate are brought out while being electrically insulated from one another by the synthetic material.

An appropriate assembly of the cooling plate and the photo-sensitive plate and a simple design of the supply leads may according to a further embodiment be obtained by the use of clamping members which on either side embrace the long edges of the cooling plate and the photosensitive plate and are electrically insulated from the cooling plate and each are electrically connected to one of the electrodes of the electrode system and end in or are provided with a led-out supply lead. This embodiment is of particular importance for sintered self supporting photo-sensitive plates which by the said clamping members and, if required, with the aid of an adhesive are brought into engagement with or secured to the cooling plates. Although the invention is of particular importance for compressed and sintered self supporting photo-sensitive bodies, it may also be applied to photo-sensitive plates provided on a support by another method, for example, by deposition from vapour. This support may in the above described manner be a cooling plate and may be mounted in an envelope in the manner in accordance with the invention. In this connection it should be noted that photo-electric cells having photo-sensitive layers provided on a support by deposition from vapour or precipitation from a solution are known. However, the known photo-electric cells differ essentially from the photo-electric cells according to the invention because either insulating supports are used so that cooling is out of the question and/or mounting in the envelope or the shape of the envelope are different and/or the support is not brought out through a seal to provide thermal contact with the ambient atmosphere.

Although in the above described manner appropriate cooling and sufficient electrical load capacity for most uses are obtained, in special cases it may be desirable for the heat dissipation of the photo-sensitive plate to be further increased by providing in accordance with the invention the side of the photo-sensitive plate covered by the electrode system with a metal gauze dissipating the heat with the interposition of an electrically insulating transparent layer, the metal gauze, which should have sufficient apertures for the passage of light, being brought into thermal contact with the cooling plate, for example, by extending the gauze to the rear side of the cooling plate. In the above-mentioned embodiment using clamping members, the metal gauze may be divided in two parts, each part being connected with a clamping member through which it is in thermal contact with the cooling plate. For this purpose the metal gauze may be divided along the center line of the active side.

In order that the invention may readily be carried into effect, three embodiments thereof will now be described, by way of example, with reference to the accompanying diagrammatic drawing, in which:

FIGURES 1a, 1b and 1c are longitudinal sectional views in two directions at right angles to one another and a cross-sectional view respectively of an embodiment of a photo-electric cell in accordance with the invention.

FIGURE 2 is a cross-sectional view of a photo-electric cell in accordance with the invention of different design with respect to the sealing area.

FIGURE 3 is a cross-sectional view of a further embodiment of a photo-electric cell in accordance with the invention.

The envelope of the photo-conductive cell shown in FIGURES 1a, 1b and 1c comprises an elongated flat glass tube 1 open at the lower end and having outer dimensions of about 40 x 15 x 5 cubic mms. This glass tube 1 having a wall thickness of about 0.8 mm. accommodates a plate-shaped photo-conductive body 2 having the dimensions 32 x 11 x 1 cubic mms. and consisting, for example, of sintered cadmium sulphide compressed to form a self-supporting body. The photo-conductive plate 2 is provided on its side 3, the active side, with an electrode system comprising two comb-like interlaced line electrodes 4 and 5 deposited from vapour. The other side 6, the neutral side, of the photo-conductive plate 2, by way of a thin insulating layer 7 of an adhesive, for example, an epoxy resin, substantially throughout its entire area is in thermal contact with part of a cooling plate 8 of metal, for example, copper, having a thickness of about 1.2 mms. The electrode system (4, 5) on the active side of the photo-conductive body is electrically insulated from the cooling plate 8 by the interposed photo-sensitive CdS and the insulating adhesive layer 7. The photo-conductive plate 2 and the portion of the cooling plate 8 occupied thereby are accommodated within the tubular envelope 1 while a further portion 9 of the cooling plate projects beyond the sealed aperture to provide thermal contact with the ambient atmosphere. This part is also designed as a support for the photo-electric cell and for this purpose comprises a bent part provided with a mounting aperture 10 for mounting on a chassis or cooling member. The seal consists of a synthetic material 11 obtained by pouring a hardening synthetic material, for example, an epoxy resin, known under the trade name "Araldite," in combination with a plate-shaped filling member 12, for example, of quartz having a coefficient of expansion of about $5 \times 10^{-7}$ which in this area entirely or partly compensates for the far greater coefficient of expansion of the synthetic material and the cooling plate with respect to the glass of the envelope ($100 \times 10^{-7}$) preventing fracture in the desired range of operational use. The thickness of the filler plate is, for example, 0.9 mm. and its longitudinal cross-sectional area is 10.5 x 4 square mms. By the use of the filler plate 12 the photo-electric cell under consideration can be used in the temperature range between $-10°$ C. and $50°$ C. With the glass commonly used for envelopes and having a coefficient of expansion of about $100 \times 10^{-7}$ as compared with coefficients of expansion of about $300 \times 10^{-7}$ and $170 \times 10^{-7}$ for the synthetic resin and the copper cooling plate respectively, such a filler member is preferably used to enable a fairly wide range of operating temperature to be covered. The filling member may be dispensed with by using glass having a higher coefficient of expansion for the envelope.

Two U-shaped clamping members 13 and 14 made, for example, of copper or nickel are provided one on each side of the photo-conductive plate 2 so as to embrace the long edges of the cooling plate 8 and the body 2. On the active side 3 of the photo-conductive plate each of these clamping members 13 and 14 is electrically connected to one of the comb-like electrodes 4 and 5 respectively. The clamping members 13 and 14 are electrically insulated from the cooling plate 8 by a mica plate 15 (FIGURE 1c). At their lower ends the clamping members 13 and 14 terminate in supply leads or lead-in conductors 16 and 17 which are led out through the seal so as to be electrically insulated from the cooling plate 8 by the synthetic material 11. As FIGURES 1a and 1c show, the clamping members 13 and 14 near the seal on the active side of the plate terminate in widened strips 16 and 17 which are led out. The remaining space within the envelope and the seal, which is comparatively small because the photo-conductive body 2 and the cooling plate 8 fit within the envelope with a small amount of clearance, is filled at least in its part enclosing the active side of the photo-conductive body with a viscous filler material 18 consisting of silico-organic grease.

FIGURE 2 is a cross-sectional view of another embodiment of a photo-electric cell in accordance with the invention taken through the seal. This photo-electric cell is distinguished from that shown in FIGURES 1a, 1b and 1c only in that electric supply leads 20 and 21 are led out each on one side of a cooling plate 22 and in that filler members 23 and 24 having dimensions of 0.9 mm. x 10.5 mms. x 4 mms. each are distributed with respect to the cooling plate 22 and synthetic material 25 more evenly than in the cell shown in FIGURES 1a, 1b and 1c. As a result the seal structure is perfectly symmetrical, permitting a temperature range of from about −40° C. to +80° C. In order to enable the supply leads 20 and 21 to be led out laterally of the cooling plate 22, which itself is disposed symmetrically with respect to the sealing aperture by being slightly bent near the seal, the supply leads 20 and 21 are secured to the lateral edges of the clamping members. The filler members 23 and 24 may obviously be shaped in the form of a closed ring or a ring built up from two engaging parts. Otherwise the structure of the photo-electric cell shown in FIGURE 2 is the same as that of the cell shown in FIGURES 1a, 1b and 1c.

FIGURE 3 is a cross-sectional view of another embodiment of a photo-electric cell in accordance with the invention taken through the photo-sensitive plate. This photo-electric cell is only distinguished from that shown in FIGURES 1a, 1b and 1c in that the entire active side of the photo-conductive plate 2 between the clamping members 13 and 14 is coated with a transparent thin insulated layer of silicone-base lacquer and in that there are arranged on this lacquer two pieces 30 and 31 of metal gauze, for example, copper gauze, having a mesh width of about 50 microns, the two pieces being separated by a space 32. The pieces 30 and 31 are connected to the clamping members 13 and 14 and are electrically insulated from one another by the space 32, and through the said clamping members 13 and 14 they are in thermal contact with the cooling plate 8. By this metal gauze 30, 31 the heat dissipation to the cooling plate is further improved. Otherwise this photo-electric cell is identical with that shown in FIGURES 1a, 1b and 1c.

Finally it should be noted that within the scope of the invention various modifications will suggest themselves to one skilled in the art. For example, the envelope may be made of synthetic material instead of from glass. The filling members may be made of other substances, for example, Ni (36%) Fe (64%) alloys having a low coefficient of expansion. Depending upon the desired temperature range and the material used the filler member may be dispensed with in some cases. The cooling plate may, if desired, be built up from several parts. The electrode systems may extend along the neutral side below the clamping members.

What is claimed is:

1. A photoconductive device comprising an elongated tubular envelope of insulating material having an open end, an elongated metal cooling plate extending almost throughout the entire envelope and including an integral portion projecting beyond the open end and outside the envelope, an elongated plate-like photosensitive body containing electrodes on one active side thereof disposed within the envelope and mounted with its other neutral side on the cooling plate with the active side separated by a layer of electrically insulating material and electrically insulated from the cooling plate and with the mounted photosensitive body defining between its periphery and the inside wall of the envelope only a small clearance space, a material filling and sealing the open end of the envelope and adhered to the inner walls thereof and to the projecting portion of the cooling plate, and lead-in conductors passing through an end of the envelope and connected to the said electrodes but spaced and insulated from the cooling plate.

2. A device as set forth in claim 1 wherein the lead-in conductors pass through the same end of the envelope through which the cooling plate projects, and the sealing material is a synthetic resin.

3. A device as set forth in claim 1 wherein the photosensitive body is a self-supporting compressed and sintered body.

4. A photoconductive device comprising an elongated tubular glass envelope with a flattened generally oval cross-section and having an open end, an elongated metal cooling plate extending almost throughout the entire envelope and including an integral portion projecting beyond the open end and outside the envelope, an elongated plate-like photosensitive body containing electrodes on one active side thereof disposed within the envelope and mounted with its other neutral side on the cooling plate with the active side separated by a layer of electrically insulating material and electrically insulated from the cooling plate and with the mounted photosensitive body defining between its periphery and the inside wall of the envelope only a small clearance space, an electrically-insulating sealing material filling and sealing the open end of the envelope and adhered to the inner walls thereof and to the projecting portion of the cooling plate extending through the envelope end, lead-in conductors passing through the sealing material and connected to the said electrodes but insulated by the sealing material from the cooling plate, and means associated with the projecting portion of the cooling plate for use as a mounting support for the device.

5. A device as set forth in claim 4 wherein the sealing material is a synthetic resin, and a plate-shaped filling member is embedded in the resin to at least partially compensate for any expansion differences between the cooling plate and the resin, and the envelope.

6. A device as set forth in claim 4 wherein a pair of clamping members electrically insulated from the cooling plate clamp the photosensitive body along its longitudinal edges to the cooling plate, said clamping members being each connected to one of the lead-in conductors and one of the electrodes.

7. A photoconductive device comprising an elongated tubular glass envelope with a flattened generally oval cross-section and having an open end, an elongated metal cooling plate extending almost throughout the entire envelope and including an integral portion projecting beyond the open end and outside the envelope, an elongated plate-like photosensitive body containing electrodes on one active side thereof disposed within the envelope and mounted with its other neutral side on the cooling plate with the active side separated by a layer of electrically insulating material and electrically insulated from the cooling plate and with the mounted photosensitive body defining between its periphery and the inside wall of the envelope only a small clearance space, a synthetic resin, electrically-insulating, sealing material filling and sealing the open end of the envelope and adhered to the inner walls thereof and to the projecting portion of the cooling plate, lead-in conductors passing through the sealing material and connected to the said electrodes but insulated by the sealing material from the cooling plate, a transparent insulating layer over the electrodes on the photosensitive body, and a heat-dissipating metal gauze thermally connected to the cooling plate and overlying the transparent insulating layer for increasing the dissipation of heat from the photosensitive body.

8. A device as set forth in claim 7 wherein clamping members are provided for clamping the photosensitive body onto the cooling plate, and the metal gauze is divided into two parts connected to the clamping members.

References Cited by the Examiner

UNITED STATES PATENTS

| | | | |
|---|---|---|---|
| 1,316,350 | 9/19 | Case | 250—211 X |
| 1,941,493 | 1/34 | Ruben | 250—212 |
| 2,183,256 | 12/39 | Gabler | 250—211 X |
| 2,540,490 | 2/51 | Rittner | 250—211 |
| 2,839,646 | 6/58 | Hester | 250—211 |
| 2,918,584 | 12/59 | Edsberg et al. | 250—211 X |
| 2,999,940 | 9/61 | Hoffmann et al. | 250—211.1 |
| 3,001,078 | 9/61 | Rulon | 250—211 X |
| 3,004,168 | 10/61 | Emeis | 250—211.1 |
| 3,040,180 | 6/62 | Healy | 250—211 X |

RALPH G. NILSON, *Primary Examiner.*

WALTER STOLWEIN, *Examiner.*